UNITED STATES PATENT OFFICE.

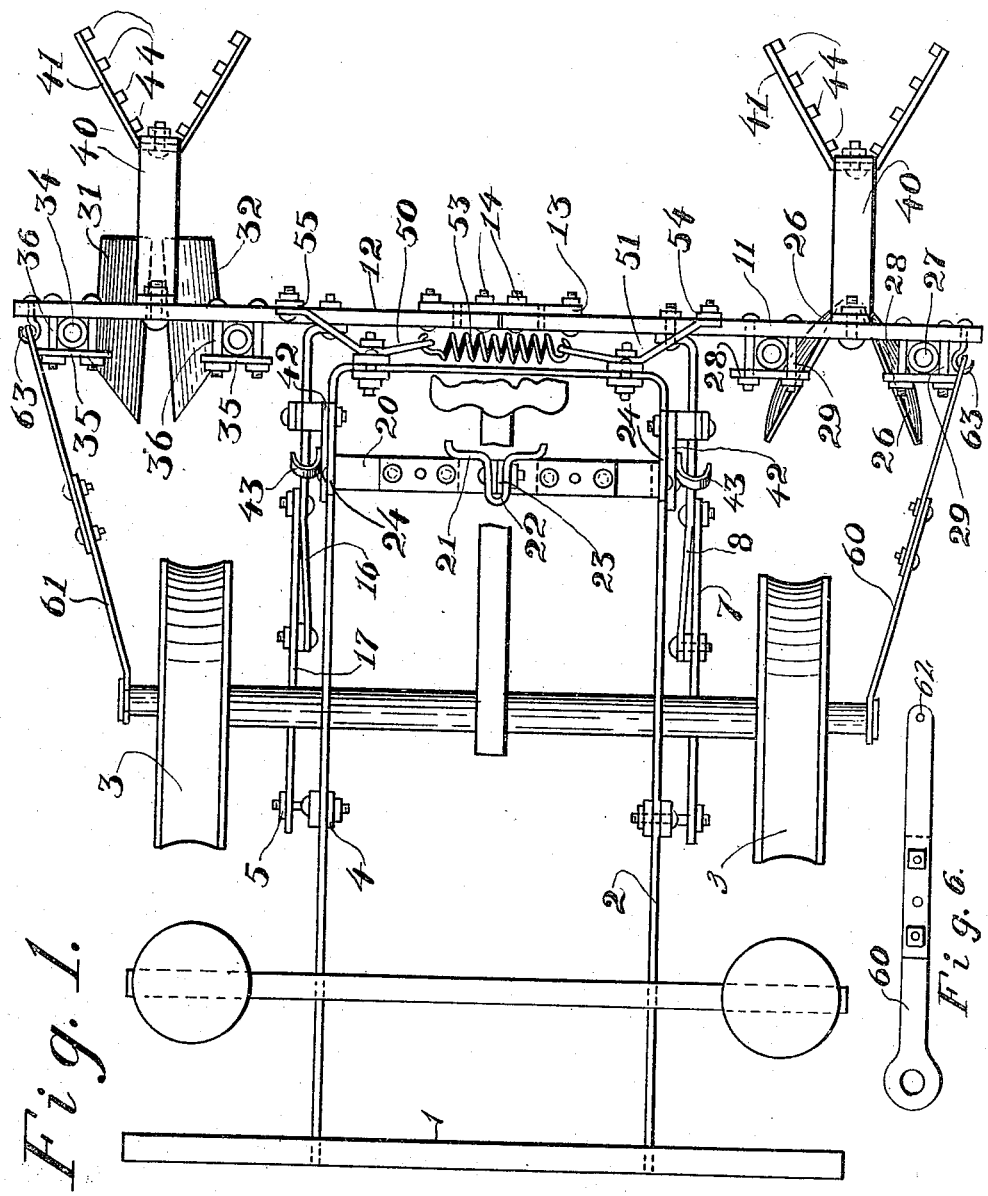

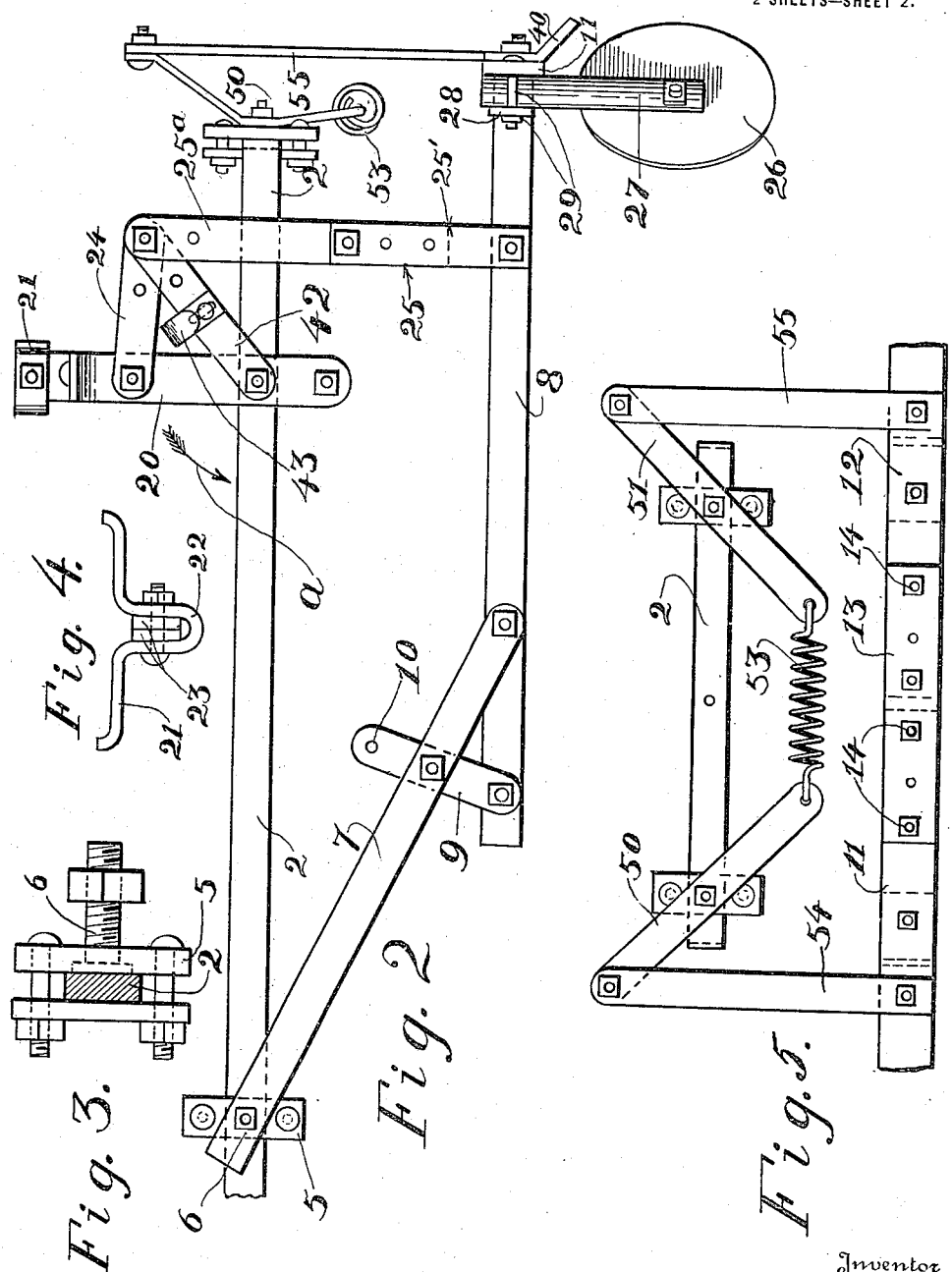

WILLIAM J. WALSH, OF CRESTON, IOWA.

CORN-PLANTER ATTACHMENT.

1,194,686.

Specification of Letters Patent. Patented Aug. 15, 1916.

Application filed July 25, 1914. Serial No. 853,071.

*To all whom it may concern:*

Be it known that I, WILLIAM J. WALSH, a citizen of the United States, residing at Creston, in the county of Union and State of Iowa, have invented certain new and useful Improvements in Corn-Planter Attachments; and I do hereby declare the following to be a full, clear, and exact description of the invention, such as will enable others skilled in the art to which it appertains to make and use the same.

This invention relates to attachments for corn planters, and the primary object of the invention is the provision of a mechanism for attachment to a corn planter of the ordinary construction which will fill in the row after the planter, thus eliminating the necessity of harrowing the ground after planting the corn, and it will also prevent the corn from washing out of the row after being planted, especially so on hilly ground.

Another object of this invention is the provision of an attachment as above specified which is adjustable so as to conform to the width and construction of various types of corn planters now in use; to provide hilling or rowing disks or shovels and clod kickers positioned rearwardly of the hilling shovels or disks for clearing the corn rows of large clods of dirt.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawings, wherein like characters of reference designate like or corresponding parts throughout the several views, and in which:—

Figure 1 is a top plan view of the improved attachment, showing the same applied to a corn planter, Fig. 2 is a side elevation of the improved attachment showing the same detached from the planter, Fig. 3 is a detail view partially in section, of a part of the construction of the attachment, showing the manner of adjustably connecting some of the parts thereof, Fig. 4 is a detail view of the foot trip, Fig. 5 is a rear view of a fragment of the corn planter attachment showing the manner of securely holding the hilling disks as shown in the drawing. Fig. 6 is a detailed view of a brace employed in the construction of the corn planter attachment.

Referring more particularly to the drawings, 1 designates a corn planter of the ordinary construction, having the seed dispensing boxes and mechanisms supported by a suitable supporting frame 2, and the usual type of traction and covering wheels 3.

The supporting frame 2 of the corn planter has a pair of plates 4 and 5 secured thereto, upon the sides of the same, and held adjustable by bolts which extend transversely through the plates and bind them securely in engagement with the planter frame. The plate 5 has a transversely extending bolt 6 carried thereby, which bolt has pivotally mounted thereupon a bar 7. The bar 7 extends downwardly and rearwardly from the plates 4 and 5 and has its lower end connected to a horizontally extending bar 8. A bracing plate 9 is also secured to the bars 7 and 8, which plate has a plurality of serially arranged transversely extending openings 10 formed therein, for regulating the angle of the bar 8 and the various mechanisms carried thereby.

The bar 8 extends rearwardly along the corn planter frame 2 and it has secured to its rear angled end a plate 11, which plate is connected to a plate 12, which is identical in construction therewith, by a connecting bar 13. The plates 11 and 12 are provided with a plurality of serially arranged openings 14 formed in their meeting ends, which openings are adapted for the reception of bolts or other suitable fastening means 15, for regulating the distance from the outer end of one plate to the other, for conformity to the width of the corn planter to which the attachment is applied. The plate 12 is connected to the corn planter frame 2 by bars 16 and 17, which bars are attached to the opposite side of the frame 2 from the bars 7 and 8, and are identical in construction therewith.

The frame 2 of the corn planter has a U-shaped brace 20 vertically adjustably connected thereto, which U-shaped brace has a foot tread or pedal 21 secured thereto substantially intermediate its ends. The foot treadle 21 is formed of a single piece of bar sheet metal, bent intermediate its end to form a loop 22, which encompasses ears 23 which are formed upon the U-shaped brace 20. The U-brace 20 is pivotally connected to the supporting frame 2 of the corn planter, and it has bars 24 pivoted to its sides a short distance downwardly from the upper end or side thereof, which bars are in turn pivotally connected to vertical bars 25. The vertical bars 25 extend downwardly from the bars 24 and are connected to the bars 8, so that when the U-shaped brace 20 is moved forwardly in an arc, as indicated by the arrow $a$ in Fig. 2 of the drawings, the bars 8 will be moved vertically, the purpose of which vertical movement will be hereinafter more fully described. The bars 24 are adjustably connected to the bars 25, so that they may be adjusted to conform to the size of various corn planters, now commonly in use. The bars 25 are composed of two bars 25' and 25ª, which bars are adjustably and pivotally connected at their meeting ends intermediate of the bars 24 and 8.

The plates 11 and 12 have connected thereto adjacent their outer ends, hilling disks 26, which hilling disks are rotatably supported upon the lower ends of rods 27. The rods 27 are held in various vertically adjusted positions by binding engagement with the forward side of the plates 11 and 12 by auxiliary plates 28, which plates securely bind the rods 27 in engagement with the plates 11 and 12, by bolts 29, which bolts are inserted through the plates 11 and 12 and the auxiliary plates 28, as is clearly shown in Figs. 1 and 2 of the drawings.

In the upper portion of Fig. 1 of the drawings, a modified form of the hilling or rowing mechanism is shown, which constitutes a pair of facing diagonally extending shovel blades 31 and 32. The shovel blades 31 and 32 are securely attached to rods 34. The rods 34 are held in binding engagement with the plates 12 by an auxiliary plate 35, and bolts 36. The rods 34 may be vertically adjusted for varying the elevation of the hilling shovels by loosening the nuts upon the bolts and sliding the rods upwardly between the plates 35 and 12. The plates 11 and 12 have rearwardly and downwardly extending arms 40 secured to the opposite sides of the plates from which the rods 27 and 34 are disposed. The rearwardly and downwardly extending arms 40 have substantially triangular shaped kickers 41 secured to their rear terminal ends, which kickers are adapted for throwing or kicking clods of dirt out of the planted row of corn. The kickers 41 have a plurality of depending nail teeth 44 secured thereto, for breaking up the clods.

The U-shaped supporting bracket 20 has diagonally extending bars 42 attached thereto, which bars have hooks 43 attached thereto, which hooks form means for limiting the forward rocking movement of the vertical bars 25 for holding the laterally extending plates 11 and 12 securely in raised position.

The rear ends of the corn planter frame 2 have bars 50 and 51 pivotally connected thereto intermediate of their ends, which bars extend upwardly and downwardly from the rear end of the corn planter 2, obliquely to the horizontal lines thereof, and have their lower terminal ends connected by a spring 53. The upper ends of the bars 51 and 50 are pivotally connected to vertical bars 54 and 55, which bars have their lower ends connected to the bars 11 and 12. The spring 53 tends to draw the lower ends of the levers or bars 50 and 51 toward each other, which forces the vertical bars 54 and 55 downwardly, causing the hilling shovels or disks to always be firmly positioned in the ground over which the corn planter travels.

The hubs of the corn planter have secured thereto longitudinally adjustable bars 60 and 61, which bars have eyes 62 formed upon their rear ends for engagement with said hooks 63, which hooks are carried by the bars 11 and 12.

In the operation of the improved corn planter attachment; the shovels 31 and 32 or the disks 26 are provided for hilling the ground about the rows of corn seed after the same has been planted, for properly preparing the ground to insure the best results in the growing of the corn, and the kickers 40 are positioned rearwardly of the hiller for kicking off of the rows any clods or large portions of soil which might be deposited upon the corn rows by the hiller. The vertical adjustment of the plates 11 and 12, together with the hillers and clod pickers carried thereby, by the oscillatory movement of the U-shaped bars connected thereto, is provided for moving the hilling and kicking devices out of engagement with the ground when it is desired to move the planter from place to place without planting corn.

From the foregoing description, taken in connection with the accompanying drawings, the advantages of the construction and of the method of operation of the improved corn planter attachment will be readily apparent to those skilled in the art to which this invention appertains and, while in the foregoing the principle of the operation of this invention has been described, together with various features of construction, it is to be understood that certain minor features of construction, combination, and arrangement of parts may be altered to suit practical conditions, provided such alterations are comprehended within the scope of what is claimed.

What is claimed is:—

The combination with a corn planter of the ordinary construction having a supporting frame, and a pair of horizontally disposed bars adjustably connected to said frame on opposite sides thereof, a pair of laterally extending plates connected to the rear ends of said horizontal bars and positioned rearwardly in said corn planter supporting frame, vertical bars connected to said horizontal bars, a U-shaped bracket pivotally connected between the side bars and the corn planter supporting frame adjacent its rear end thereof and to said vertical bars for elevating said horizontal bars and lateral plates upon pivotal movement of said U-shaped bracket, a plurality of ridging elements adjustably carried by laterally extending plates to the opposite ends thereof, supporting arms secured to the rear face of said laterally extending plates and extending rearwardly and downwardly therefrom, and a substantially triangular shaped kicking member secured to the rear free terminal of said supporting arm, means for limiting the pivotal movement of said U-shaped bracket and for limiting the vertical adjustment of said plates.

In testimony whereof I affix my signature in presence of two witnesses.

WILLIAM J. WALSH.

Witnesses:
E. N. DOUGHERTY,
W. F. BUSLEY.

Copies of this patent may be obtained for five cents each, by addressing the "Commissioner of Patents, Washington, D. C."